US010455110B2

(12) United States Patent
Shih et al.

(10) Patent No.: US 10,455,110 B2
(45) Date of Patent: *Oct. 22, 2019

(54) SUGGESTING IMAGE FILES FOR DELETION BASED ON IMAGE FILE PARAMETERS

(71) Applicant: Microsoft Technology Licensing, LLC, Redmond, WA (US)

(72) Inventors: Nai Wen Shih, Seattle, WA (US); Robert Zachary Nisco, Seattle, WA (US); Greg Edmiston, Seattle, WA (US); Emmanuel Miranda-Steiner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,524

(22) Filed: Apr. 11, 2018

(65) Prior Publication Data
US 2018/0241900 A1 Aug. 23, 2018

(51) Int. Cl.
H04N 1/21 (2006.01)
G06T 7/00 (2017.01)
(Continued)

(52) U.S. Cl.
CPC ......... H04N 1/2104 (2013.01); G06T 7/0002 (2013.01); H04N 1/00408 (2013.01); G06K 9/46 (2013.01); H04N 2201/3295 (2013.01)

(58) Field of Classification Search
CPC ...... G06F 3/1208; G06F 3/1243; G06F 3/125; G06F 3/1256; G06F 17/30082;
(Continued)

(56) References Cited

U.S. PATENT DOCUMENTS 5,301,350 A * 4/1994 Rogan .................... G06F 16/58
705/33
5,726,778 A 3/1998 Tanio
(Continued)

FOREIGN PATENT DOCUMENTS

| CN | 103777899 A | 5/2014 |
| CN | 104809198 A | 7/2015 |
| CN | 105512221 A | 4/2016 |

OTHER PUBLICATIONS

"WorkCam—Keep your Work and Personal Photos Separate", Retrieved From https://web.archive.org/web/20140705151429/https://itunes.apple.com/us/app/workcam-keep-your-work-personal/id786879018?mt=8, Feb. 12, 2014, 3 Pages.
(Continued)

Primary Examiner — Aklilu K Woldemariam
(74) Attorney, Agent, or Firm — Michael Best & Friedrich LLP

(57) ABSTRACT

The present disclosure describes a system and method to manage image file storage that includes a memory device to store instructions and at least one processing device to execute the instructions stored in the memory device to determine a blur indication or a burst characteristic for each of a plurality of files stored on a storage medium, automatically identify candidate image files to delete based at least in part on the blur indication or the burst characteristic, and delete at least some of the candidate image files based on receiving a delete indication.

20 Claims, 11 Drawing Sheets

(51) Int. Cl.
*H04N 1/00* (2006.01)
*G06K 9/46* (2006.01)

(58) Field of Classification Search
CPC ......... G06F 17/30117; G06F 17/30221; G06F 17/3028; G06F 19/321; G06F 2003/0697; G06F 3/0601; G06F 17/30067; G06F 17/30274; G06F 21/6218; G06F 21/6236; G06F 21/6272; G06F 2203/04802; G06F 2221/2141; G06F 3/0483; G06F 3/04845; G06F 17/30902; G06F 17/30079; G06F 11/1469; G06F 17/30088; G06F 17/30094; G06F 17/30126; G06F 2201/84; G06F 3/04815; G06F 3/0619; G06F 3/065; G06F 3/0685; G06F 9/5055; G06F 16/162; G06F 16/583; G06F 16/13; G06F 3/0608; G06F 3/0652; H04N 1/00145; H04N 1/00164; H04N 1/00167; H04N 1/00177; H04N 1/00188; H04N 1/00196; H04N 1/0044; H04N 5/23245; H04N 5/23251; H04M 19/02; H04M 2201/40; H04M 2201/41; H04M 3/2281; H04M 3/36; H04M 3/38; H04M 3/382; H04M 3/385; H04M 3/387; H04M 3/42221; H04M 3/56; H04M 1/72522; G06Q 10/067; G06Q 10/10; G06Q 30/02; G06Q 30/0601; G06Q 40/12; G06Q 30/0269; Y10S 707/915; Y10S 707/941; Y10S 707/99945; Y10S 707/99953; Y10S 707/99956; Y10S 707/959; H04L 63/102; H04L 67/1095; H04L 67/1097; H04L 67/306; G06K 2009/00328; G06K 9/00288; G11B 27/031; G11B 27/11
USPC ........ 382/100, 118, 195, 224, 305; 707/644, 707/608, 823, 915, 205, 104, 100, 201, 707/203, 204
See application file for complete search history.

(56) References Cited

U.S. PATENT DOCUMENTS

| | | | |
|---|---|---|---|
| 6,038,295 A | 3/2000 | Mattes | |
| 6,330,572 B1* | 12/2001 | Sitka | G06F 19/321 707/608 |
| 6,466,237 B1* | 10/2002 | Miyao | G06F 3/0483 715/838 |
| 6,502,106 B1* | 12/2002 | Gampper | G06F 16/9574 709/202 |
| 6,560,631 B1* | 5/2003 | Ishihara | G06F 16/134 709/201 |
| 6,961,559 B1* | 11/2005 | Chow | H04M 3/42314 455/414.1 |
| 7,106,843 B1* | 9/2006 | Gainsboro | H04M 3/2281 379/191 |
| 8,082,523 B2 | 12/2011 | Forstall et al. | |
| 8,891,832 B2 | 11/2014 | Tseng | |
| 8,923,551 B1* | 12/2014 | Grosz | G06F 16/583 382/100 |
| 8,935,322 B1* | 1/2015 | Grosz | G06F 3/04842 709/203 |
| 9,576,187 B2 | 2/2017 | Hsi | |
| 9,754,355 B2 | 9/2017 | Chang et al. | |
| 9,892,203 B2 | 2/2018 | Houston et al. | |
| 10,122,777 B2 | 11/2018 | Clinton | |
| 10,200,813 B1 | 2/2019 | Allen et al. | |
| 2001/0022621 A1 | 9/2001 | Squibbs | |
| 2002/0034296 A1* | 3/2002 | Yoshimune | G06F 21/10 380/239 |
| 2004/0169684 A1 | 9/2004 | Orth et al. | |
| 2004/0247206 A1* | 12/2004 | Kaneda | G06F 16/56 382/305 |
| 2005/0254780 A1* | 11/2005 | Takemura | G11B 27/031 386/241 |
| 2006/0120618 A1* | 6/2006 | Mizoguchi | G06T 7/0002 382/255 |
| 2006/0221779 A1 | 10/2006 | Matsushita et al. | |
| 2007/0038689 A1* | 2/2007 | Shinkai | G06F 16/119 |
| 2008/0103906 A1 | 5/2008 | Singh | |
| 2010/0201708 A1 | 8/2010 | Dresel et al. | |
| 2011/0047463 A1 | 2/2011 | Shepherd et al. | |
| 2011/0122126 A1 | 5/2011 | Han et al. | |
| 2011/0231420 A1* | 9/2011 | Chen | G06F 16/178 707/758 |
| 2011/0231424 A1* | 9/2011 | Avdanina | G06F 16/1787 707/769 |
| 2012/0101995 A1* | 4/2012 | Agetsuma | G06F 3/0605 707/644 |
| 2012/0114199 A1 | 5/2012 | Panyam et al. | |
| 2013/0265450 A1 | 10/2013 | Barnes, Jr. | |
| 2014/0085495 A1* | 3/2014 | Almalki | H04N 5/23245 348/208.6 |
| 2014/0321762 A1 | 10/2014 | Pozas Trevino et al. | |
| 2015/0242706 A1 | 8/2015 | Brown | |
| 2016/0036822 A1* | 2/2016 | Kim | H04L 67/1097 726/4 |
| 2017/0212910 A1 | 7/2017 | Morris et al. | |
| 2017/0364303 A1 | 12/2017 | Shih et al. | |
| 2018/0035074 A1 | 2/2018 | Barnes, Jr. | |
| 2018/0095960 A1 | 4/2018 | Tan | |
| 2018/0150186 A1 | 5/2018 | Norieda et al. | |
| 2018/0204884 A1 | 7/2018 | Isa | |

OTHER PUBLICATIONS

"International Search Report and Written Opinion Issued in PCT Application No. PCT/US2017/054645", dated Jan. 22, 2018, 12 Pages.
"Non-Final Office Action Issued in U.S. Appl. No. 15/288,761", dated Sep. 18, 2018, 26 Pages.
Evans, Liana, "24. Audiences Trust Icons and Avatars", https://www.oreilly.com/library/view/social-media-marketing/9780768694956/ch24.html, Nov. 12, 2010, 4 Pages.
"Final Office Action Issued in U.S. Appl. No. 15/288,761", dated Feb. 20, 2019, 26 Pages.
"First Office Action Issued in Chinese Patent Application No. 201780037567.8", dated Jul. 29, 2019, 16 Pages.
"Non Final Office Action Issued in U.S. Appl. No. 15/288,761", dated Aug. 6, 2019, 20 Pages.

* cited by examiner

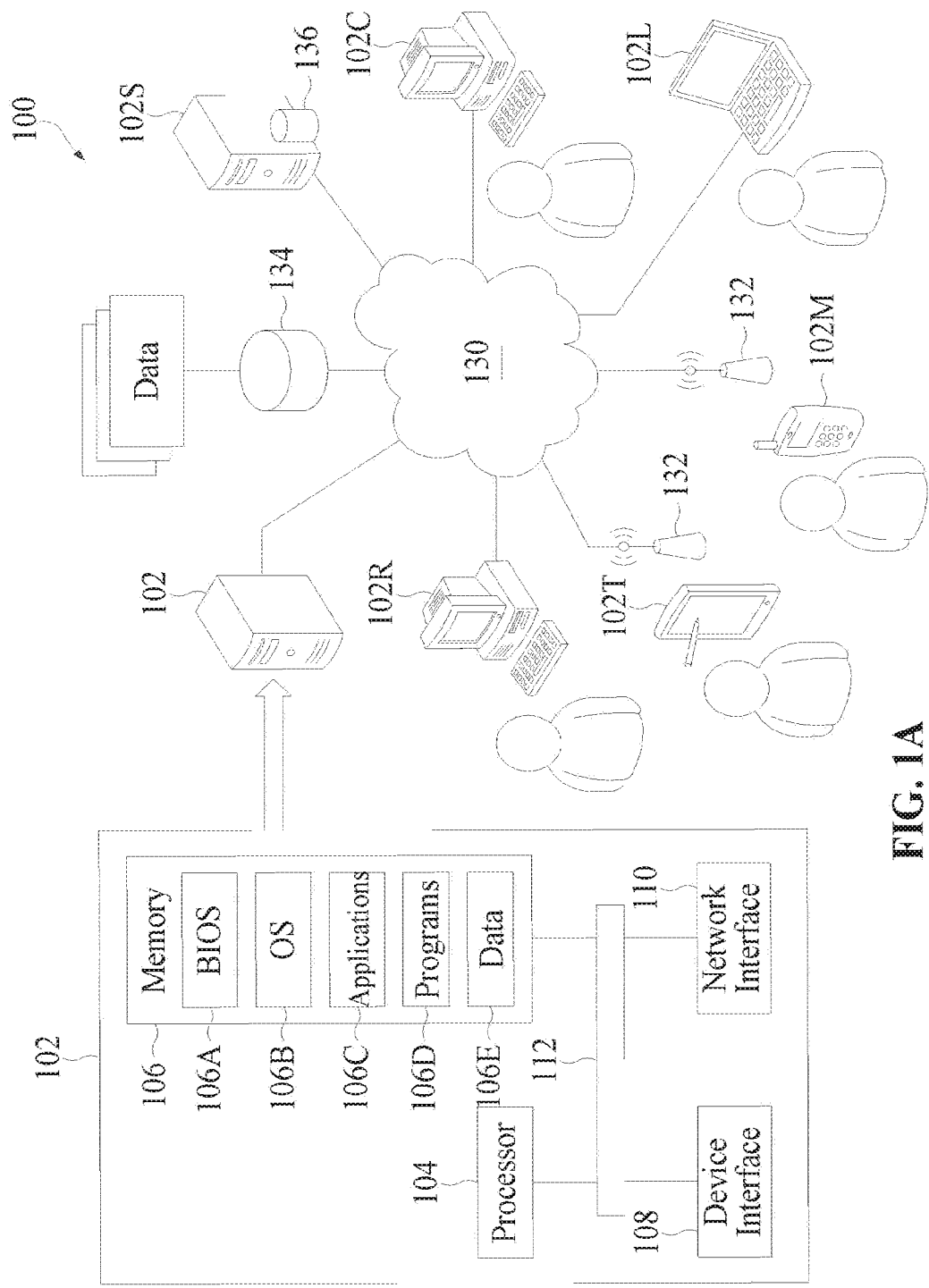

SUGGESTING IMAGE FILES FOR DELETION BASED ON IMAGE FILE PARAMETERS

TECHNICAL FIELD

The present disclosure relates to the management of image file storage and, more particularly, to suggesting image files for deletion based on image file parameters.

BACKGROUND

Mobile devices have become ubiquitous largely due to impressive computing ability in a relatively small and portable footprint. Mobile devices may include hardware and software to capture still or moving images files, e.g., photographs and videos. Once captured, mobile devices may temporarily or permanently store the image files on memory resident in the device itself or on cloud memory accessed via a global network. Device memory is finite and set at device manufacture. Service providers often allocate cloud memory to user accounts based on a tiered system. A higher tier purchased for a higher price may buy a higher allotment of cloud memory to a user account relative to a lower tiered account. As the hardware and software to capture images improves, image file size increases, in turn, challenging finite device memory or cloud memory allocation for a particular tier. A need remains, therefore, for an improved method or system to manage image file storage based on image file parameters.

SUMMARY

The present disclosure describes a system and method to manage image file storage based on image file parameters. An exemplary system may comprise a memory device to store instructions and at least one processing device to execute the instructions stored in the memory device to determine a blur indication or a burst characteristic for each of a plurality of files stored on a storage medium, automatically identify candidate image files to delete based at least in part on the blur indication or the burst characteristic, and delete at least some of the candidate image files based on receiving a delete indication.

The at least one processing device may execute the instructions stored in the memory device further to measure available storage capacity on the storage medium to store at least one file, delete the at least some of the candidate image files until the available storage capacity on the storage medium is sufficient to store the at least one file, and store the at least one file after deleting the at least some of the candidate image files.

The at least one processing device may execute the instructions stored in the memory device further to graphically identify the candidate image files to delete using a selection icon on each candidate image file.

The at least one processing device may execute the instructions stored in the memory device further to graphically display a list of the plurality of files, a resettable selection icon corresponding to each candidate image file to delete, and a delete icon to enable the delete indication.

The at least one processing device may execute the instructions stored in the memory device further to sort the plurality of files based at least in part on the blur indication or the burst characteristic.

The at least one processing device may execute the instructions stored in the memory device further to graphically display thumbnails of each of the plurality of files and metadata corresponding each file of the plurality of files overlaid each of the thumbnails.

The at least one processing device may execute the instructions stored in the memory device further to graphically display a storage bar indicating a total storage capacity, wherein a first portion of the storage bar graphically indicates the available storage capacity, and wherein a second portion of the storage bar graphically indicates a storage capacity of the candidate image files to delete.

The at least one processing device may execute the instructions stored in the memory device further to graphically display a command confirming deletion of the candidate image files.

An exemplary method may comprise determining, using a computing device, available storage capacity on a storage medium to store at least one file, determining, using the computing device, predetermined parameters for each of a plurality of files stored on the storage medium, the predetermined parameters including a blur indication or a burst characteristic of a corresponding file, identifying, using the computing device, a subset of the plurality of files to delete based on the predetermined parameters, causing, using the computing device, at least partial deletion of at least one of the subset of the plurality of files until the available storage capacity on the storage medium is sufficient to store the at least one file, and storing, using the computing device, the at least one file after the at least partial deletion.

The exemplary method may further comprise automatically identifying, using the computing device, the subset of the plurality of files to delete based on the predetermined parameters.

The exemplary method may further comprise graphically displaying, using the computing device, the subset of the plurality of files to delete using a selection icon corresponding to each of the subset of the plurality of files to delete.

The exemplary method may further comprise receiving, at the computing device, a selection of at least some of the subset of the plurality of files and causing, using the computing device, at least partial deletion of the selected some of the subset of the plurality of files.

The exemplary method may further comprise using the computing device to graphically display: the plurality of files, a selection icon on each of the subset of the plurality of files to delete, and a command icon to enable at least partial deletion of the subset of the plurality of files based at least in part on the selection icon.

The exemplary method may further comprise sorting the plurality of files based on the blur indication or on the burst characteristic of a corresponding file.

The exemplary method may further comprise graphically displaying thumbnails of each of the plurality of files and metadata corresponding to each file of the plurality of files overlaid each of the thumbnails.

The exemplary method may further comprise using the computing device to graphically display a storage bar that indicates a total storage capacity, wherein a first portion of the storage bar graphically indicates the available storage capacity and wherein a second portion of the storage bar indicates a storage capacity of the subset of the plurality of files to delete.

The exemplary method may further comprise using the computing device to graphically display a dialog box confirmation the at least partial deletion of the at least a portion of the subset of the plurality of files.

An exemplary computer-readable storage medium may comprise instructions that, when executed by one or more processing devices, cause the one or more processing devices to measure available storage capacity on a storage medium to store at least one file, determine a blur indication or a burst characteristic for each of a plurality of files stored on a storage medium, automatically identify a subset of the plurality of files to delete based on the blur indication or the burst characteristic, delete at least a portion of the subset of the plurality of files until the available storage capacity on the storage medium is sufficient to store the at least one file, and store the at least one file after deleting the at least the portion of the subset of the plurality of files.

The exemplary computer-readable storage medium may further comprise graphically displaying a list of the plurality of files, a selection icon corresponding to each file of the subset of the plurality of files to delete, and a command icon to enable at least partial deletion of the subset of the plurality of files based at least in part on the selection icon.

The exemplary computer-readable storage medium may further comprise graphically displaying a storage bar indicating a total storage capacity, wherein a first portion of the storage bar graphically indicates the available storage capacity and wherein a second portion of the storage bar indicates a storage capacity of the subset of the plurality of files to delete.

BRIEF DRAWINGS DESCRIPTION

The present disclosure describes various embodiments that may be understood and fully appreciated in conjunction with the following drawings:

FIGS. 1A and 1B schematically illustrate a block diagram of an exemplary system, in accordance with some embodiments;

FIG. 1C schematically illustrates block diagram of an exemplary image capture device, in accordance with some embodiments;

FIG. 1D schematically illustrates block diagram of an exemplary image file manager, in accordance with some embodiments;

DETAILED DESCRIPTION

Figure 1B:
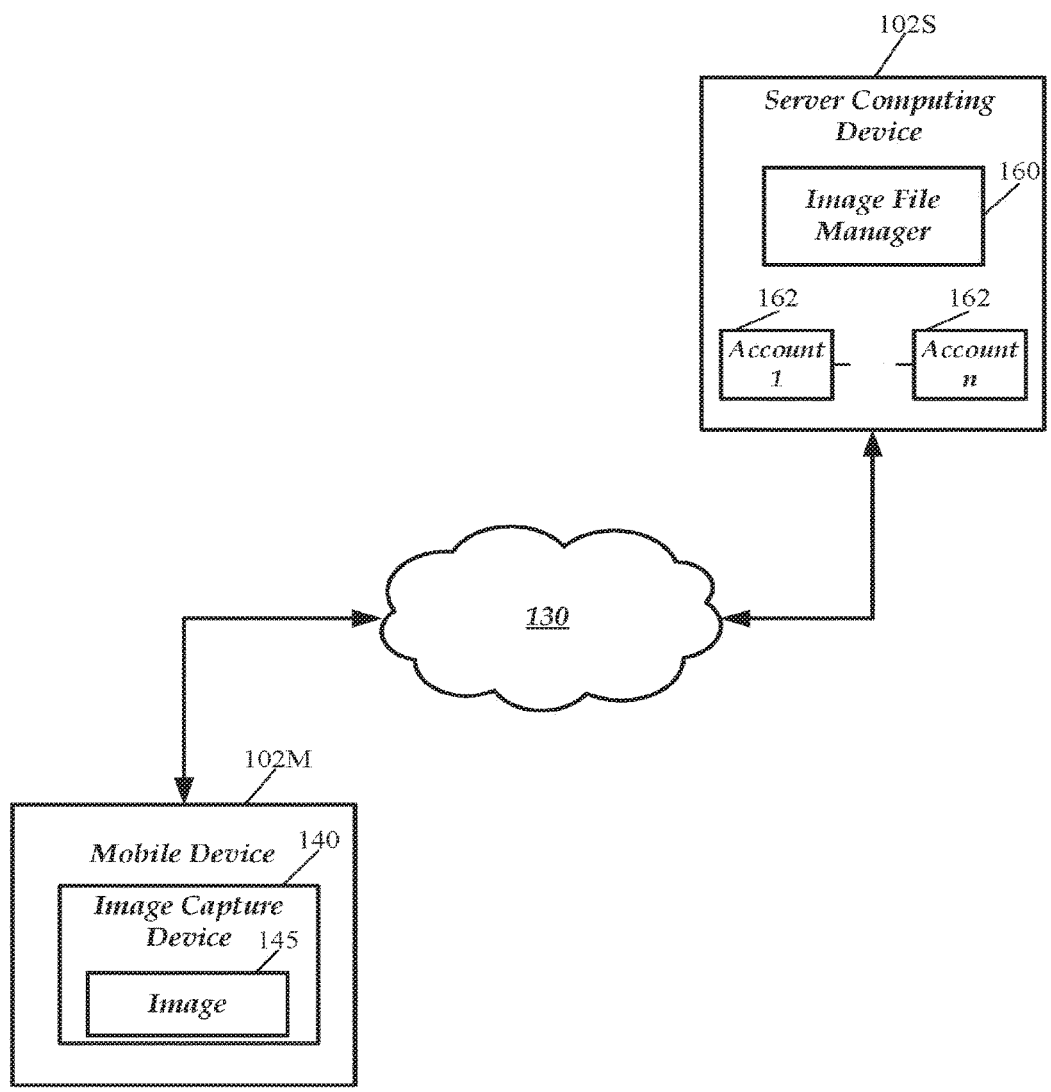

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

FIGS. 1A and 1B schematically illustrate a block diagram of an exemplary system 100, in accordance with some embodiments. Referring to FIGS. 1A and 1B, system 100 includes a computing device 102 that may execute instructions defining components, objects, routines, programs, instructions, data structures, virtual machines, and the like that perform particular tasks or functions or that implement particular data types. Instructions may be stored in any computer-readable storage medium known to a person of ordinary skill in the art, e.g., system memory 106, remote memory 134, or external memory 136. Some or all of the programs may be instantiated at run time by one or more processors comprised in a processing unit, e.g., processing device 104. A person of ordinary skill in the art will recognize that many of the concepts associated with the exemplary embodiment of system 100 may be implemented as computer instructions, firmware, hardware, or software in any of a variety of computing architectures, e.g., computing device 102, to achieve a same or equivalent result.

Moreover, a person of ordinary skill in the art will recognize that the exemplary embodiment of system 100 may be implemented on other types of computing architectures, e.g., general purpose or personal computers, handheld devices, mobile communication devices, gaming devices, music devices, photographic devices, multi-processor systems, microprocessor-based or programmable consumer electronics, minicomputers, mainframe computers, application specific integrated circuits, and like. For illustrative purposes only, system 100 is shown in FIG. 1A to include computing devices 102, server computing device 102S, client computing device 102C, geographically remote computing devices 102R, tablet computing device 102T, mobile computing device 102M, and laptop computing device 102L. A person of ordinary skill in the art may recognize that computing device 102 may be embodied in any of tablet computing device 102T, mobile computing device 102M, or laptop computing device 102L. Mobile computing device 102M may include mobile cellular devices, mobile gaming devices, mobile reader devices, mobile photographic devices, and the like.

A person of ordinary skill in the art will recognize that an exemplary embodiment of system 100 may be implemented in a distributed computing system in which various computing entities or devices, often geographically remote from one another, e.g., computing device 102 and remote computing device 102R or server computing device 102S and client computing device 102C, perform particular tasks or execute particular objects, components, routines, programs, instructions, data structures, and the like. For example, the exemplary embodiment of system 100 may be implemented in a server/client configuration connected via network 130 (e.g., server computing device 102S may operate as a server and client computing device 102C or tablet computing device 102T may operate as a client, all connected through network 130). In distributed computing systems, application programs may be stored in and/or executed from local memory 106, external memory 136, or remote memory 134. Local memory 106, external memory 136, or remote memory 134 may be any kind of memory, volatile or non-volatile, removable or non-removable, known to a person of ordinary skill in the art including non-volatile memory, volatile memory, random access memory (RAM), flash memory, read only memory (ROM), ferroelectric RAM, magnetic storage devices, optical discs, or the like.

Computing device 102 may comprise processing device 104, memory 106, device interface 108, and network interface 110, which may all be interconnected through bus 112. Processing device 104 may be embodied in a single, central processing unit, or a plurality of processing units in a single or two or more computing devices 102, e.g., computing device 102 and remote computing device 102R. Processing device 104 may be any type of processing device, having any type of speed, capacity, functionality, or otherwise known to a person of ordinary skill in the art. Local memory 106, as well as external memory 136 or remote memory 134, may be any type memory device known to a person of ordinary skill in the art including any combination of RAM, flash memory, ROM, ferroelectric RAM, magnetic storage devices, optical discs, and the like that is appropriate for the particular task. Local memory 106 may store a database, indexed or otherwise. Local memory 106 may store a basic input/output system (BIOS) 106A with routines executable by processing device 104 to transfer data, including data 106E, between the various elements of system 100. Local memory 106 also may store an operating system (OS) 106B executable by processing device 104 that, after being initially loaded by a boot program, manages other programs in the computing device 102. OS 106B may employ graphical user interface windowing environment. An embodiment of OS 106B is a Windows® brand operating system sold by Microsoft Corporation, such as Windows® 95 or Windows NT® or other derivative versions of Windows®. However, other operating systems that provide windowing environments may be employed, such as the Macintosh OS from Apple Corporation and the OS/2 Presentation Manager from IBM. Memory 106 may store routines or programs executable by processing device 104, e.g., applications 106C or programs 106D. Applications 106C or programs 106D may make use of the OS 106B by making requests for services through a defined application program interface (API). Applications 106C or programs 106D may be used to enable the generation or creation of any application program designed to perform a specific function directly for a user or, in some cases, for another application program. Examples of application programs include word processors, calendars, spreadsheets, database programs, browsers, development tools, drawing, paint, and image editing programs, communication programs, tailored applications, and the like. Users may interact directly with computing device 102 through a user interface such as a command language or a user interface displayed on a monitor (not shown separately from computing device 102). At least a portion of local memory 106 may be comprised in one or more processing units, e.g., processing device 104.

Device interface 108 may be any one of several types of interfaces. Device interface 108 may operatively couple any of a variety of devices, e.g., hard disk drive, optical disk drive, magnetic disk drive, or the like, to the bus 112. Device interface 108 may represent either one interface or various distinct interfaces, each specially constructed to support the particular device that it interfaces to the bus 112. Device interface 108 may additionally interface input or output devices utilized by a user to provide direction to the computing device 102 and to receive information from the computing device 102. These input or output devices may include voice recognition devices, gesture recognition devices, touch recognition devices, keyboards, displays, monitors, mice, pointing devices, speakers, stylus, microphone, joystick, game pad, satellite dish, printer, scanner, camera, video equipment, modem, monitor, and the like (not shown). Device interface 108 may be a serial interface, parallel port, game port, firewire port, universal serial bus, or any other interface known to a person of ordinary skill in the art.

A person of ordinary skill in the art will recognize that the system 100 may use any type of computer readable medium accessible by a computer, such as magnetic cassettes, flash memory cards, compact discs (CDs), digital video disks (DVDs), cartridges, RAM, ROM, flash memory, magnetic disc drives, optical disc drives, and the like. A computer readable medium as described herein includes any manner of computer program product, computer storage, machine readable storage, or the like.

Network interface 110 may operatively couple computing device 102 to one or more server computing devices 102S, remote computing devices 102R, tablet computing devices 102T, mobile computing devices 102M, client computing devices 102C, and laptop computing devices 102L, on a local, wide, or global area network 130. Computing devices 102R or server computing devices 102S may be geographically remote from computing device 102 or client computing device 102C. Remote computing device 102R or server computing device 102S may have the structure of computing device 102 and may operate as server, client, router, switch, peer device, network node, or other networked device and typically includes some or all of the elements of computing device 102. Computing device 102 may connect to network 130 through a network interface or adapter included in the interface 110. Computing device 102 may connect to network 130 through a modem or other communications device included in or coupled to network interface 110. Computing device 102 alternatively may connect to network 130 using a wireless device 132. The modem or communications device may establish communications to remote computing devices 102R through global communications network 130. A person of ordinary skill in the art will recognize that applications 106C or programs 106D may be stored, downloaded, or updated remotely through such networked connections. Network 130 may be local, wide, global, or otherwise and may include wired or wireless connections employing electrical, optical, electromagnetic, acoustic, or other carriers as is known to a person of ordinary skill in the art.

The present disclosure may describe some portions of the exemplary system 100 using algorithms and symbolic representations of operations on data bits within a memory, e.g., memory 106. A person of ordinary skill in the art will understand these algorithms and symbolic representations as most effectively conveying the substance of their work to others of ordinary skill in the art. An algorithm is a self-consistent sequence leading to a desired result. The sequence requires physical manipulations of physical quantities. Usually, but not necessarily, these quantities take the form of electrical or magnetic signals capable of being stored, transferred, combined, compared, and otherwise manipulated by physical devices, e.g., computing device 102. For simplicity, the present disclosure refers to these physical signals as bits, values, elements, symbols, characters, terms, numbers, or like. The terms are merely convenient labels. A person of ordinary skill in the art will recognize that terms such as computing, calculating, generating, loading, determining, displaying, or like refer to the actions and processes of a computing device, e.g., computing device 102. The computing device 102 may manipulate and transform data represented as physical electronic quantities within a memory into other data similarly represented as physical electronic quantities within the memory.

In an embodiment, system 100 may be a distributed network in which some computing devices 102 operate as servers, e.g., computing device 102S, to provide content, services, or the like, through network 130 to other computing devices operating as clients, e.g., client computing device 102C, remote computing device 102R, laptop computing device 102L, tablet computing device 102T. In some circumstances, distributed networks use highly accurate traffic routing systems to route clients to their closest service nodes.

In an embodiment, system 100 may include server computing device 102S and mobile computing device 102M as shown in FIG. 1B. Mobile computing device 102M may further include an image capture device 140 that captures an image 145 of any object, person, animal, place, scene, or the like. Image capture device 140 may include a digital camera and attendant processing circuitry as explained in more detail below.

Figure 1C:
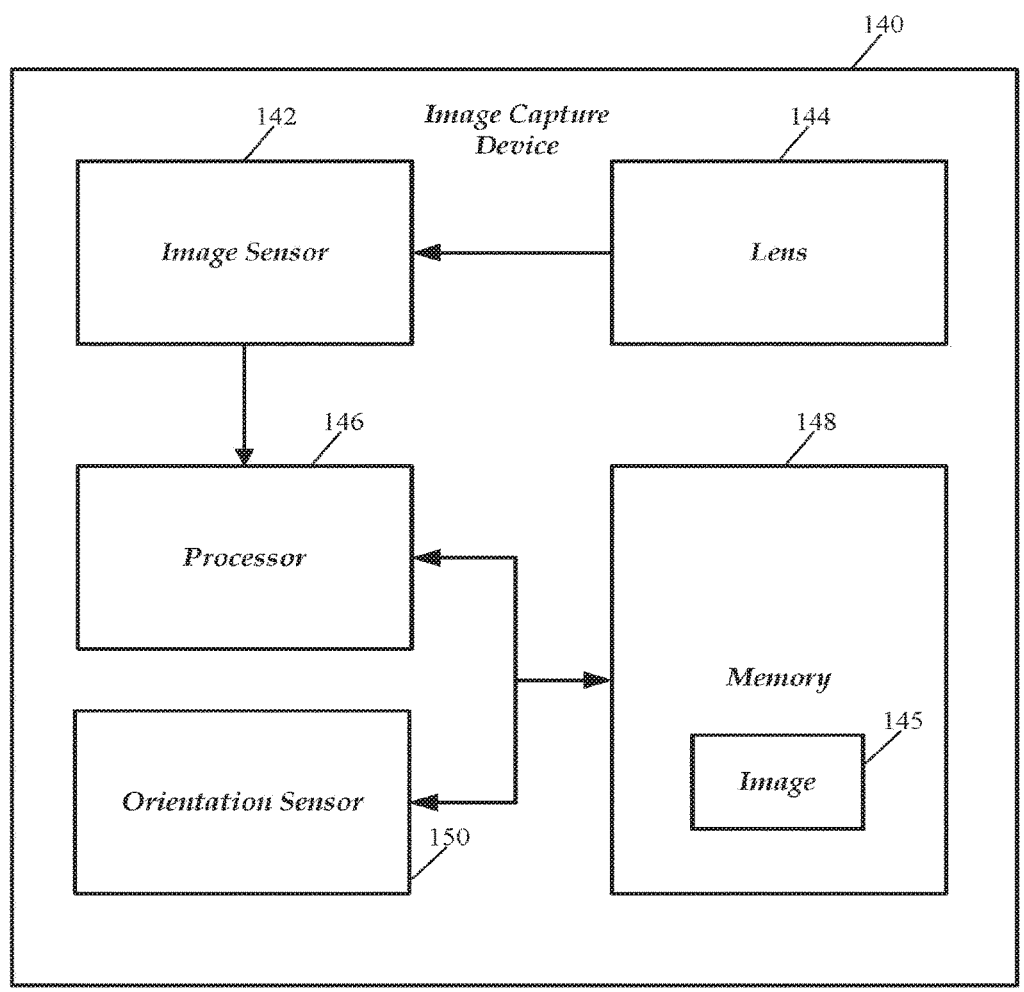

FIG. 1C schematically illustrates block diagram of an exemplary image capture device 140, in accordance with some embodiments. Referring to FIGS. 1A-1C, image capture device 140 may include an image sensor array 142, a lens 144, and processor 146. Lens 144 may focus light from a subject on image sensor array 142. Processor 146 may control lens 144 and image sensor array 142 as is well known to a person of ordinary skill in the art. Image sensor array 142 may capture image 145 as a plurality of pixel values in response to actuation of a shutter release, switch, or button (not shown) by a user. Image capture device 140 may further include a memory 148 to store image 145. Memory 148 may be local to mobile computing device 102M (e.g., memory 106) or may be remote to mobile device 102M (e.g., memory 134 or 136) but accessible to mobile computing device 102M. Memory 148 may include any type, size, or configuration of memory known to a person of ordinary skill in the art, e.g., removable memory, non-volatile memory, volatile memory, or the like. Memory 148 may include flash, dynamic random access (DRAM), static random access memory (SRAM), content addressable memory, read only memory (ROM), or the like.

Image capture device 140 may store image 145 as an object or file in memory 148, according to predefined and standardized formats, e.g., Joint Photographic Experts Grout (JPEG), Graphics Interchange Exchange (GIF), raw, or the like. Within each file, image capture device 140 may arrange pixel values in a specific order, such as from left-to-right and from top-to-bottom. Mobile computing device 102M may display image 145 on a display based on the organization and pixel value order within the image object. An image object in accordance with a predefined format may contain pixel rows that extend horizontally relative to the orientation of image 145 when image 145 is eventually displayed on a display device (not shown) of mobile computing device 102M.

During or after capturing image 145, image capture device 140 may transfer the pixel values from image sensor array 142 to memory 148 for processing and/or storage, permanent or otherwise. This processing may involve arranging or formatting the pixel values into image 145 that conforms to a predefined standard format, e.g., JPEG, GIF, or the like. Image capture device 140 may compress or format the pixel values from image sensor array 142. Image capture device 140 may transfer the compressed or formatted pixel values as image 145 to removable memory 148 for storage therein. Processor 146 may access memory 148. In some embodiments, memory 148 may part of a removable storage device capable of being removed from image capture device 140 (or mobile computing device 102M) by a user and plugged into another computing device 102, e.g., remote computing device 102R, for further viewing or downloading of images stored thereon.

In an embodiment, image capture device 140 may include an orientation sensor 150 to indicate an orientation of the image sensor array 142 when an image is captured. Orientation sensor 150 may indicate whether the image capture device 140 (or mobile computing device 102M) is being held by a user in a landscape orientation or in a rotated, portrait orientation that is 90° from the landscape orientation. Orientation sensor 150 may enable processor 146 to automatically digital rotate captured images to correct for different orientations of image sensor 142.

Processor 146 may control the operation of lens 144, image sensor array 142, memory 148, orientation sensor 150, or any combination thereof. Processor 146 may be any processing device of any size, type, or configuration known to a person of ordinary skill in the art.

Server computing device 102S may include an image file manager 160 to manage image file storage on memory 106. Mobile computing device 102M may be geographically remote from server computing device 102S but connected to server computing device 102S through, e.g., network 130. Server computing device 102S may provide computing, content, services, or the like, through network 130 to mobile computing device 102M. In some instances, server computing device 102S may store, manage, and process image files for mobile computing device 102M rather than mobile computing device 102M storing, managing, and processing image files locally. In an embodiment, a user of mobile computing device 102M may subscribe to a user account 162 on server computing device 102S for free, for a fee, or for other consideration, e.g., the viewing of sponsored ads or other content as is well known to a person of ordinary skill in the art.

Server computing device 102S may host user account 162 as is well known to a person of ordinary skill in the art. User account 162 may allocate a predetermined amount of storage to a user, e.g., 5 Gb, 10 Gb, and the like in any memory or storage device in system 100, e.g., system memory 106, remote memory 134, or external memory 136. User accounts 162 may be tiered such that the amount of storage that image file manager 160 allocates to each account 162 may vary based on the tier level of the user's subscription. For example, image file manager 160 may allocate 5 Gb of storage to user account 162 to a first (free) tier level while allocating 10 Gb of storage to another user account 162 to a second (fee) tier level. Server computing device 102S may receive image file 145 from mobile computing device 102M through network 130 and store image file 145 in association with user account 162. Server computing device 102S may host any number of user accounts 162, as is well known to those of ordinary skill in the art.

Server computing device 102S may receive image 145 from mobile computing device 102M through network 130. Server computing device 102S may include processor 160 to process image 145. Server computing device 102S may further include or have access to applications 106C or programs 106D, e.g., calendar, contacts, social media, or camera roll. A person of ordinary skill in the art should recognize that one or more of applications 106C or programs 106D may be executing on computing devices other than server computing device 102S, e.g., computing device 102R, that may be coupled to server computing device 102S through known mechanisms, e.g., network 130.

Figure 1D:
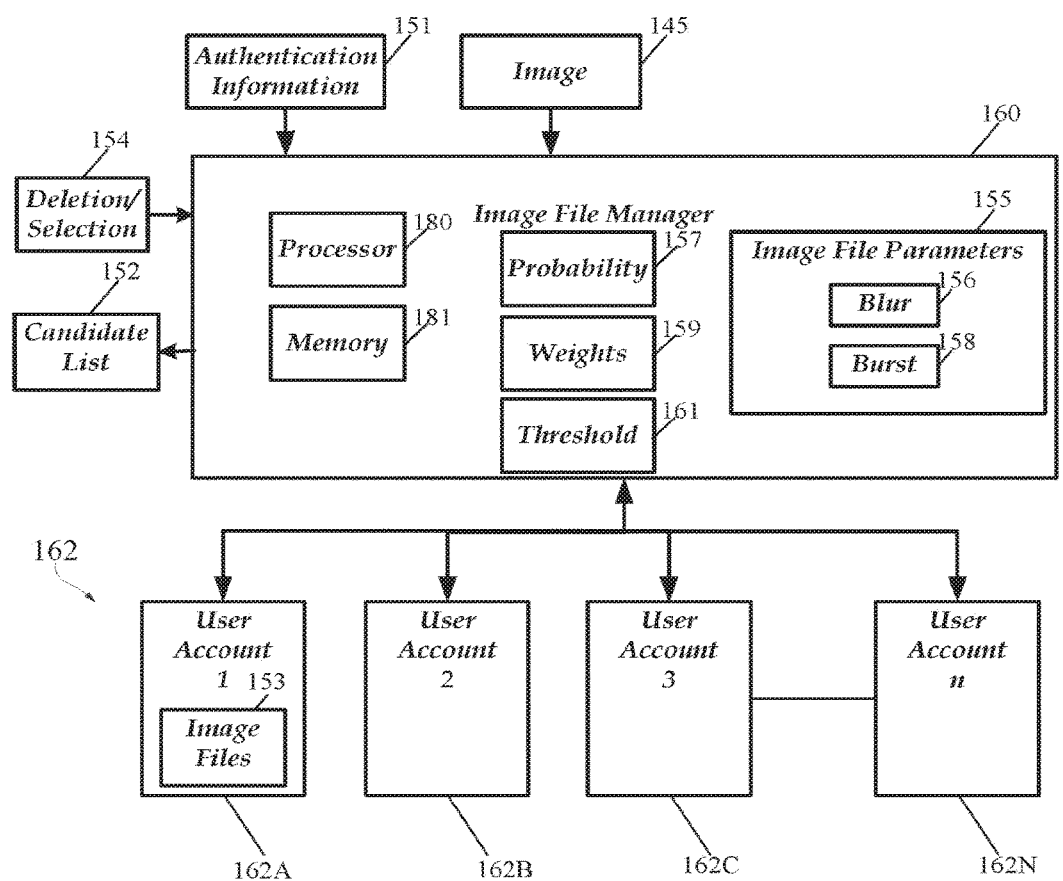

FIG. 1D schematically illustrates block diagram of an exemplary image file manager 160, in accordance with some embodiments. Referring to FIGS. 1A-1D, image file manager 160 may include a processor 180 and a memory 181 to temporarily or permanently store image 145 received from image capture device 140 of mobile computing device 102M. Processor 180 may be any single processing device or multiple processing devices of any size, type, or configuration known to a person of ordinary skill in the art. Like memory 148, memory 181 may be any type of memory in any configuration or size known to a person of ordinary skill in the art. Memory 181 may be local or remote from server computing device 102S, e.g., system memory 106, remote memory 134, or external memory 136. In an embodiment, image file manager 160 may temporarily store image file 145 after receiving image file 145 from mobile computing device 102M for analysis by processor 180 before permanently storing image file 145 into one of the user accounts 162.

In an embodiment, a user of mobile computing device 102M may have a subscription to a user account 162 on server computing device 102S. In an embodiment, user accounts 162 may be private, secured accounts, accessed only after proper authentication by server computing device 102S. Server computing device 102S may receive authentication information 151 from mobile computing device 102M that server computing device 102S uses to authenticate access to a particular user account 162, e.g., user account 162A. For simplicity, we refer to user account 162A but server computing device 102S may authenticate users and provide access to any of user accounts 162, including user accounts 162B, 162C, to 162N.

Authentication information 151 may include any type of information necessary to access user account 162A known to a person of ordinary skill in the art, e.g., user name, user email, password, challenge questions and answers, personal identification numbers, knowledge based questions and answers, and the like. In an embodiment, some of the authentication information 151 may have been provided or set up by the user at initiation of the subscription. Server computing device 102S may employ any protocol or standard to secure user accounts 162 known to a person of ordinary skill in the art. Once the user is authenticated, server computing device 102S may provide access to a user account 162, e.g., user account 162A.

Image file manager 160 may receive image file 145 for storage into user account 162A. Image file manager 160 may determine available storage capacity in user account 162A to determine whether sufficient storage capacity exists to store image file 145. If sufficient storage capacity exists in user account 162A, image file manager 160 may store image file 145 into user account 162A. If user account 162A has insufficient storage capacity to store image file 145, image file manager 160 may automatically identify a list of candidate image files 152 from a plurality of image files 153 currently stored in user account 162A for deletion. List of candidate image files 152, in some embodiments, will include a subset of image files 153 currently stored in a particular user account 162, e.g., user account 162A, that file manager 160 determines is a candidate for deletion for a variety reasons, including duplicate files, blurry images, burst files, least accessed files, and so on. In an embodiment, image file manager 160 may determine available storage capacity by a difference between a total storage allocation for user account 162A based on subscription parameters, e.g., memory allocation, tier, fee, and the like, and an amount of storage used by image files 153 currently stored in user account 162A. For example, if user account 162A has a total memory or storage allocation of 5 Gb and currently stored image files 153 use 2 Gb, the available storage capacity is 3 Gb.

In an embodiment, image file manager 160 may identify candidate image files list 152 after receiving a manual command (not shown) to do so from a user of mobile computing device 102M.

Alternatively, image files manager 160 may automatically determine or otherwise identify candidate list 152 for deletion from currently stored image files 153 without necessitating user intervention. In an embodiment, image file manager 160 may identify candidate list 152 after determining that user account 162A does not have sufficient storage capacity to store image file 145 without necessitating user intervention. In yet another embodiment, image file manager 160 may identify candidate list 152 on a predetermined temporal or periodic scheduled, e.g., once a week, once a month, on the first of each month, every Tuesday, and the like. In yet a further embodiment, image file 160 may identify candidate list 152 at a predetermined threshold for available storage capacity, e.g., at 10% or 20% available storage capacity.

Image file manager 160 may identify candidate list 152 for deletion based at least in part on determining at least one image file parameter 155 corresponding to each of image files 153. Candidate list 152 may list or otherwise identify a subset or group of image files 153 that are candidates for deletion because they are duplicate image files, they are the least accessed files, or because they have a low quality based on image file parameters 155. In an embodiment, image file manager 160 may present candidate list 152 to a user of mobile device 102M for confirmation of selection and/or deletion 154. In an embodiment, a user of mobile device 102M may indicate with a selection 154 that he desires either additional or different image files 153 for deletion. Thus, although image file manager 160 may automatically identify candidate list 152 to mobile device 102M without necessitating user intervention, image file manager 160 may delete at least a portion of candidate list 152 on receiving selection or deletion confirmation 154.

In an embodiment, image file manager 160 may analyze each of image files 153 to determine at least one image file parameter 155 that measures a particular quality, feature, characteristic, or metric corresponding to each of image files 153, e.g., contrast, image histogram, last time accessed, size, time of image capture, type of image, a blur indication 156, a burst characteristic 158, or the like. Image file manager 160 may use any computer applications, programs, or algorithms known to a person of ordinary skill in the art to perform image processing on image file 145 to calculate image quality parameters 155. Like other image file parameters 155, blur indication 156 may indicate a level blur, haziness, cloudiness, visual indistinctness, lack of sharpness, or the like in each of image files 153. A variety of factors may cause blur in an image, e.g., defocus at the point of image capture, camera shake, motion, and so on. The presence of blur in an image may reach a particular threshold level that renders elements of the image difficult to discern and thus, perceived by a user as having a low quality. Image file manager 160 may measure blur indication 156 using any known blur detecting algorithms known to a person of ordinary skill in the art, e.g., blur detecting algorithms based on frequency domain calculations, digital signal processing, filtering, Fourier transforms, and the like.

Burst characteristic 158 may indicate whether the corresponding image is one of several images captured in rapid succession using a burst mode on mobile computing device 102M. In burst mode, mobile computing device 102M may capture any number of burst images at high speed at predetermined intervals. The number of burst images may be determined by the shutter speed and amount of available storage space on mobile computing device 102M. Burst images may be used to capture moving subjects, candid portraits, the perfect stride, interactions in street photography, groups of people, and the like. Often, only a subset of a group of burst images has the desired level of quality, framing, timing, clarity, sharpness, and the like, while the rest may be discarded or deleted. Image file manager 160 may measure burst characteristic 158 using any algorithm, application, program, or technique known to a person of ordinary skill in the art including analyzing metadata associated with each image to determine if the image includes a burst indication or flag. Once image file manager 160 determines that a subset or group of image files 153 is part of a burst of images, image file manager 160 may further measure other qualities, features, characteristics, or metrics of each image file within the subset or group of image files 153 to identify candidate list 152 for deletion.

In an embodiment, image file manager 160 may determine candidate list 152 by measuring other qualities, features, characteristics, or metrics, or combinations thereof, of each image file within the subset or group of image files 153. For example, image file manager 160 may determine that an image file 153 be added to candidate list 152 based on image file 153 having little tonal range, i.e., a substantially black or white image. For another example, image file manager 160 may determine that an image file 153 be added to candidate list 152 based on image file 153 being severely over or under exposed particularly where image file 153 is part of a burst of images and other images within the burst have higher quality image file parameters 155. For yet another example, image file manager 160 may determine that an image file 153 be added to candidate list 152 based on image file 153 being last accessed or viewed over a predetermined time ago. For yet another example, image file manager 160 may determine that an image file 153 be added to candidate list 152 based on the size of image file 153.

In an embodiment, image file manager 160 may determine a probability 157 that takes into account any number and combination of image file parameters 155. In an embodiment, image file manager 160 may weigh image file parameters 155 with weights 159. For example, let P1, P2, and P3 indicate a first, second, and third image file parameters 155, respectively, where P1 may refer to blur characteristic 156, P2 may refer to an image exposure metric, and P3 may refer to a number of months that have transpired since the image file 153 was last accessed. Image file parameters 155 may refer to any known image file parameters known to a person of ordinary skill in the art, e.g., blur characteristic 156, burst indication 157, exposure, contrast, size, image type, image content, image tonal range, and the like. Further, let W1, W2, and W3 indicate a first, second, and third weights 159, respectively. Weights 159 may have any value, integer or otherwise, that is known to a person of ordinary skill in the art. In an embodiment, weights 159 may have a value between 0 and 1, e.g., weight W1 may have a value of 0.5, weight W2 may have a value of 0.75, and weight W3 may have a value of 0.8.

In an embodiment, file manager 160 may apply weight W1 to parameter P1, weight W2 to parameter P2, weight W3 to parameter P3, and so on, to calculate or otherwise determine probability 157.

An exemplary probability calculation follows:

$$\text{Probability} = (W1 \times P1) + (W2 \times P2) + (W3 \times P3) + \ldots (Wn \times Pn)$$

A person of ordinary skill in the art should recognize that many other calculations are possible to determine probability 157.

In an embodiment, file manager 160 may access weights 159 from memory 181, e.g., in a look up table or the like. In an embodiment, weights 159 may be preset at least initially at e.g., start up. Weights 159 may be manually changed by a user using a graphical user interface, e.g., GUI 300 described below. In an embodiment, file manager 160 may automatically change weights 159 based on user file deletion history. For example, if a user of user account 162A has a history of deleting image files 153 that have not been accessed for longer than a year, then file manager 160 may automatically increase weight 159 applied to access parameter 155 over time. By doing so, file manager 160 may positively impact the user's interaction with system 100 generally and candidate list 152 specifically by improving the automatically identified image files 153 that the user is more likely to delete to improve storage capacity management.

File manager 160 may identify image files 153 for which probability 157 exceeds a predetermined threshold 161, adding or otherwise associating the identified image files 153 to candidate list 152. Predetermined threshold 161 may be preset at, e.g., start up. The predetermined threshold may be manually changed by a user using a graphical user interface, e.g., GUI 300 described below.

Figure 2A:
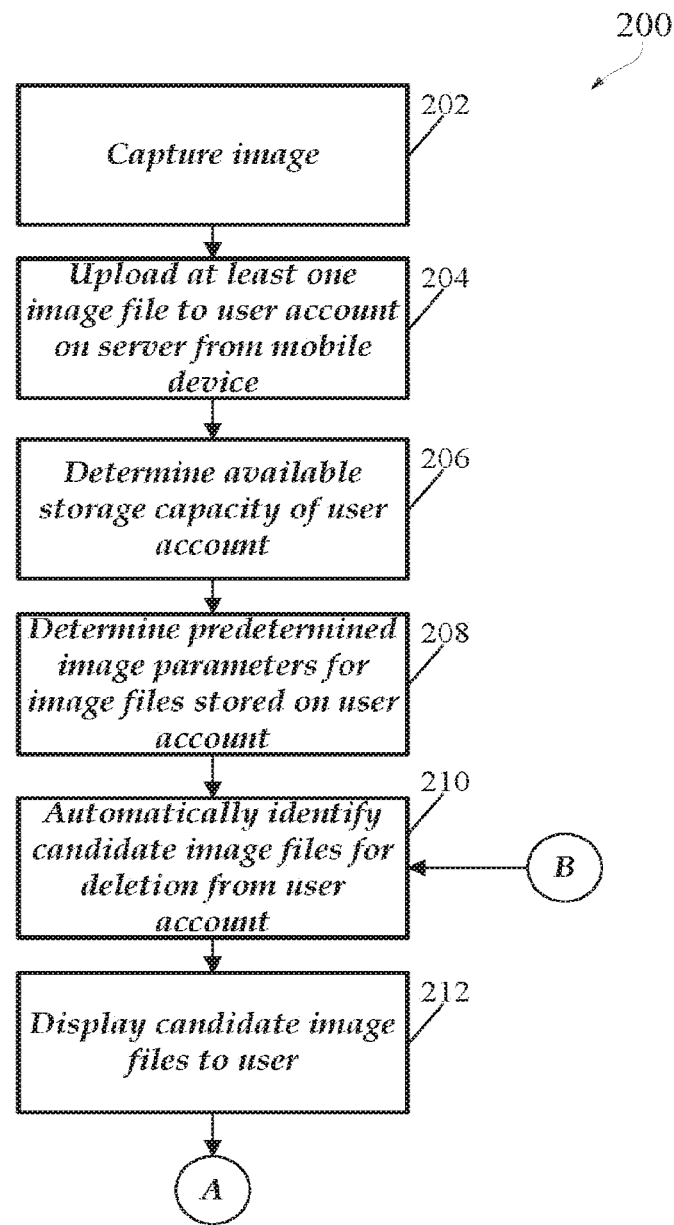
FIGS. 2A and 2B illustrate a block diagram of an exemplary method, in accordance with some embodiments.
Figure 2B:
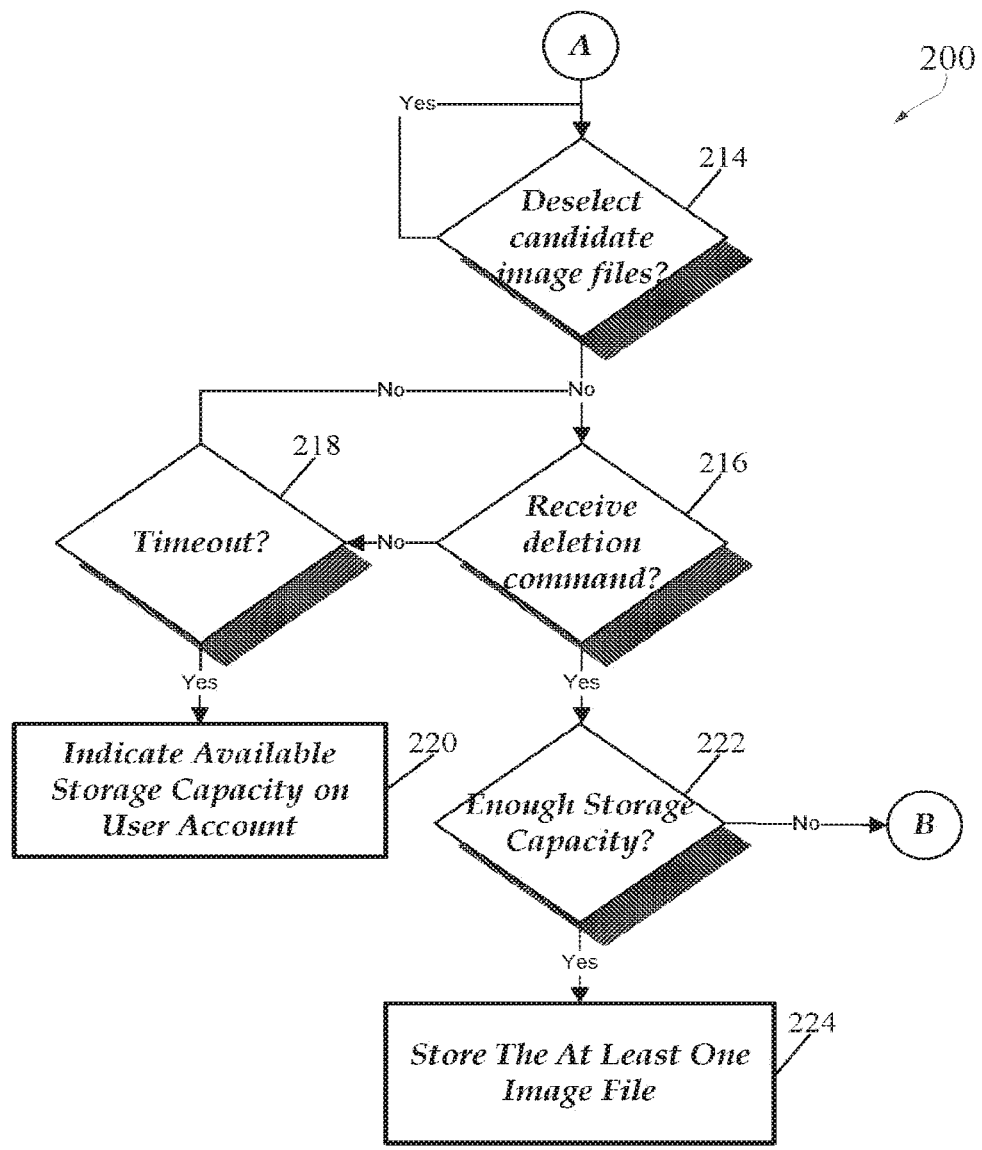

FIGS. 2A and 2B illustrate a block diagram of an exemplary method 200, in accordance with some embodiments. At 202, method 200 captures an image with an image capture device. Method 200 may focus light on an image sensor array in image capture device to capture a subject in response to activation of a shutter release, switch, button, or other activation means. Once captured, method 200 may store the captured image in temporary or permanent memory in image capture device before transmitting the image to a server computing device using a global or other network.

At 204, method 200 may automatically upload the image from the image capture device to an image file manager executing on a server computing device without any intervention from a user. Alternatively, method 200 may upload the image from the image capture device to the image file manager executing on the server computing device in response to a user action or command. Method 200 may transmit the image from the image capture device to the image file manager executing on the server without necessitating further or separate instruction or action from a user to do so, other than activation of a shutter release, switch, button, or other activation means. Method 200 may transmit the image from the image capture device to the image file manager application or program using any means known to a person of ordinary skill in the art. In an embodiment, a user may provide authenticating information to the server to allow for identification and access to a user account on the server. Provision of such authenticating information may occur before, after, or concurrent with image capture or image file transmission from the image capture device to the image file manager.

At 206, method 200 may optionally determine available storage capacity of user account. Method 200 may determine available storage capacity by determining the total storage capacity allocated to the particular account and the amount of storage used by the currently-stored image files.

At 208, method 200 may calculate, measure, or otherwise determine image file parameters for each of the currently-stored image files in the user account. Method 200 may analyze each of the currently-stored image files by applying known applications, programs, or algorithms that measure qualities, features, characteristics, or metrics of each image file. For example, method 200 may determine a blur characteristic or a burst indication along with size, sharpness, contrast, exposure, color, type, categorization, or any other image file parameter known to a person of ordinary skill in the art.

At 210, method 200 may automatically identify candidate image files for deletion from the currently-stored image files based at least in part on one or combinations of the image file parameters determined at 208. Method 200 may identify the candidate image files for deletion without necessitating user intervention. In an embodiment, method 200 may determine a blur indication or burst characteristic using programs, applications, algorithms, or other means known to a person of ordinary skill in the art. A blur indication may indicate a level blur, haziness, cloudiness, visual indistinctness, lack of sharpness, or the like in each of image files. A variety of factors may cause blur in an image, e.g., defocus at the point of image capture, camera shake, motion, and so on. The presence of blur in an image may reach a particular threshold level that renders elements of the image difficult to discern and thus, perceived by a user as having a low quality. A burst characteristic may indicate whether the corresponding image is one of several images captured in rapid succession using a burst mode on mobile computing device. In burst mode, a mobile computing device may capture any number of burst images at high speed at predetermined intervals. The number of burst images may be determined by the shutter speed and mount of available storage space on mobile computing device. Burst images may be used to capture moving subjects, candid portraits, the perfect stride, interactions in street photography, groups of people, and the like. Often, only a subset of a group of burst images has the desired level of quality, framing, timing, clarity, sharpness, and the like, while the rest may be discarded or deleted. Method 200 may measure a burst characteristic using any algorithm, application, program, or technique known to a person of ordinary skill in the art including analyzing metadata corresponding to each image to determine if the image includes a burst indication or flag.

At 212, method 200 may display or otherwise present the candidate list of image files for deletion to a user using any means known to a person of ordinary skill in the art. In an embodiment, method 200 may display the candidate list of images for deletion on a display or monitor associated with a server or other computing device, including an image capture device. In some embodiments, method 200 may transmit the candidate list of image files for deletion from the server using a global network to the mobile computing device for display to the user.

At 214, method 200 may determine whether the user has made any changes to the candidate list by either adding image files to or removing image files from the candidate list. Method 200 may add image files to the candidate list in any manner known to a person of ordinary skill in the art, including my selecting additional image files from the image files currently-stored in the user account. Likewise, method 200 may remove image files from the candidate list by deselecting image files from those included in the candidate list.

At 216, method 200 may determine whether it has received a deletion command from the user. If method 200 receives a deletion command, it may delete all or just a portion of the image files listed on the candidate list. Conversely, method 200 may delete as many image files are necessary until sufficient storage capacity exists to store the new image file in the user account.

At 218, method 200 may wait to receive a deletion command from the user until a timeout occurs at 218. The timeout may be any predetermined period of time, preprogramed, predetermined, or manually set.

At 220, method 200 may indicate the amount of available storage without deleting any of the image files on the candidate list in the absence of receiving a deletion command within a timeout period.

At 222, method 200 may optionally determine is enough storage capacity exists to store the new image file. In an embodiment, method 200 may delete a first candidate image file and determine whether sufficient available storage space exists in the user account to store the new image file. If not, method 200 may delete additional files in a loop until sufficient available storage space exists in the user account to store the new image file.

At 224, method 200 may store the newly-received image file into the user account.

FIGS. 3A-3D illustrate an exemplary graphical user interface (GUI) 300 for managing deletion of image files as implemented in computer system 100. Referring to FIGS. 1A-1D and 3A-3D, GUI 300 may be presented to a user on any computing device 102 using any means known to a person of ordinary skill in the art. GUI 300 may be implemented as an application program written in a conventional programming language, using the extensive built-in graphic capabilities of the Windows® operating environment. The application program is typically stored on and executes from some type of computer-readable storage medium such as the memory or storage discussed above in relation to FIGS. 1A-1D.

Figure 3A:
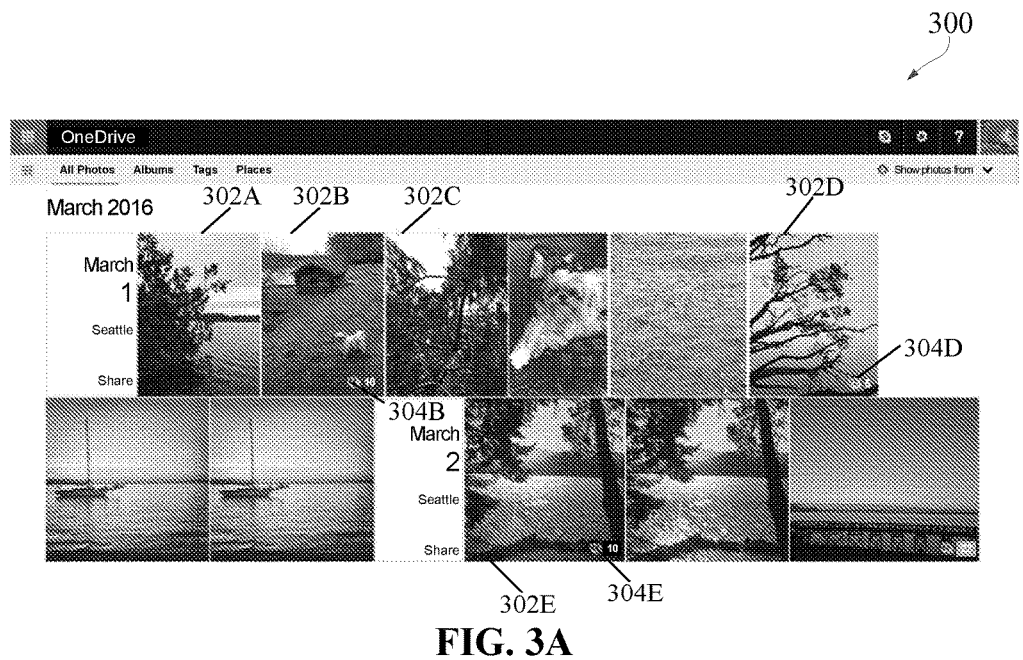
FIGS. 3A-3E illustrate an exemplary graphical user interface (GUI) for managing deletion of image files.
Figure 3B:
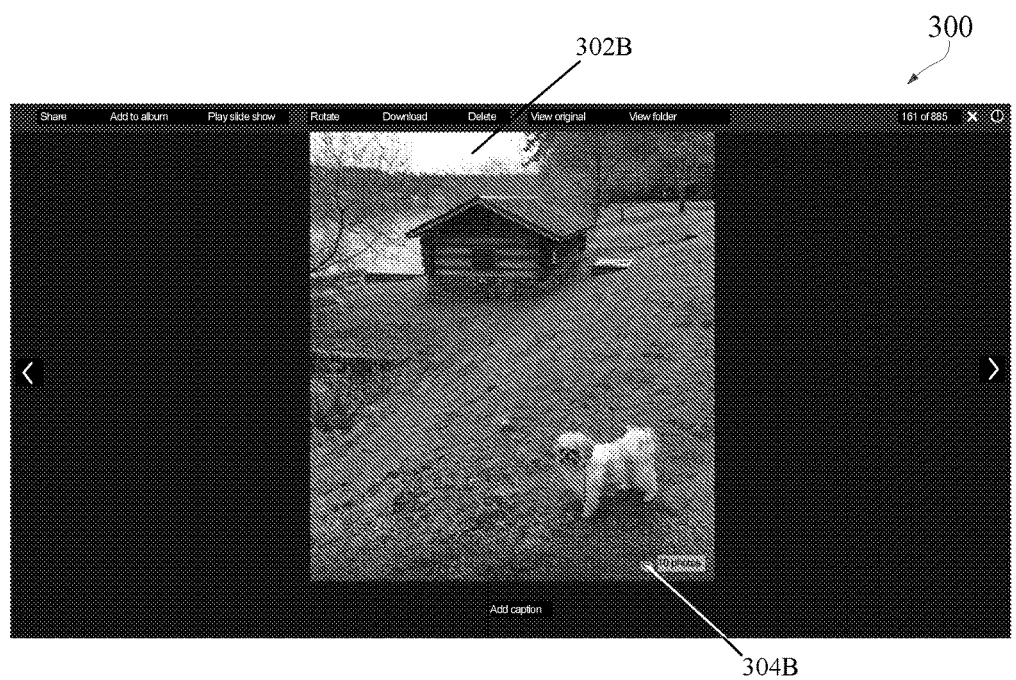
Figure 3C:
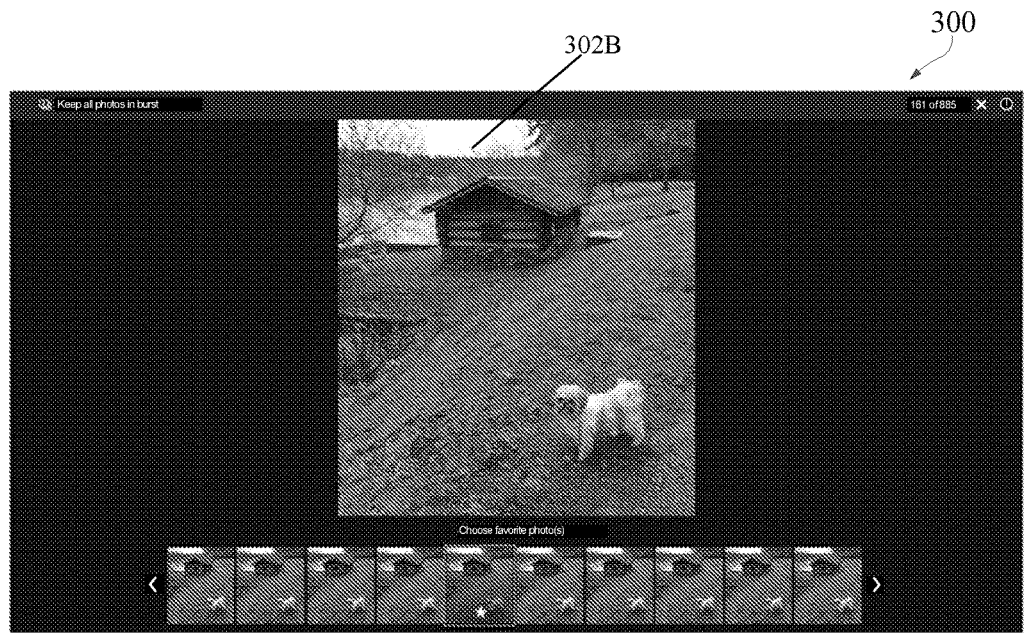
Figure 3D:
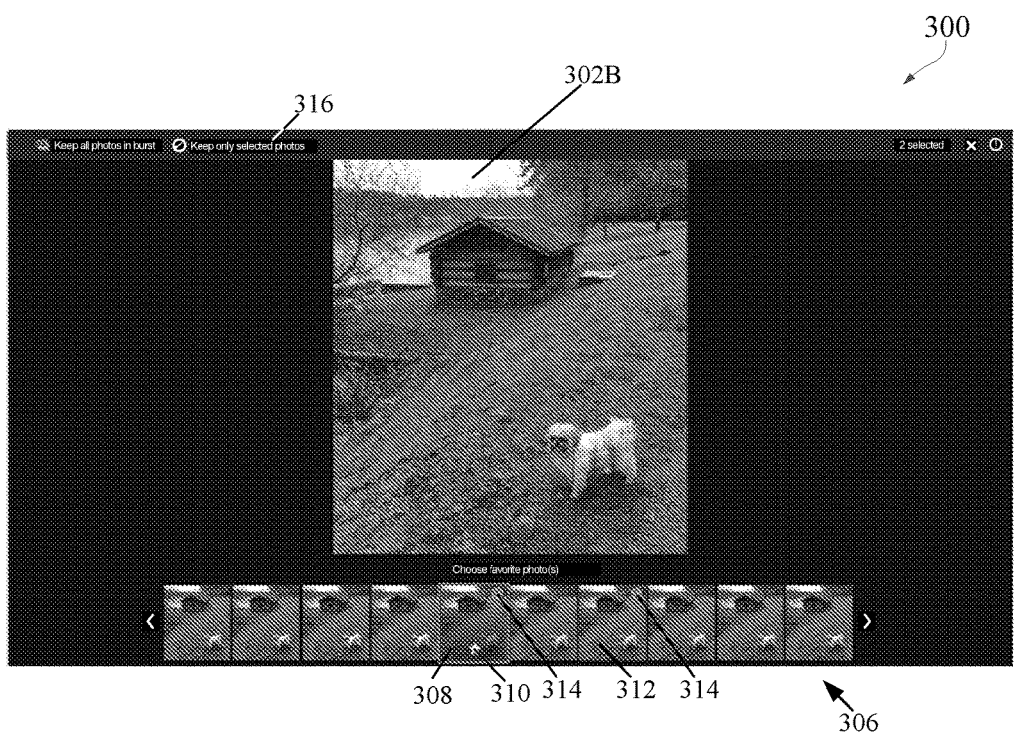

GUI 300 may have several distinct display regions or windows, e.g., display regions 302A, 302B, 302C, 302D, and 302E. Each display region 302A, 302B, 302C, 302D, 302E may display a thumbnail of an image file 153 currently-stored in user account 162A. In an embodiment, GUI 300 may display the thumbnail of the image file 153 along with attendant information relating to the corresponding image file 153, e.g., metadata, date, categorization, file name, file size, and the like. GUI 300 may identify image files captured using a burst mode, e.g., image files 302B, 302D, and 302E, by displaying a representative thumbnail of an image file with a burst indication 304B, 304D, and 304E, respectively. Burst indications 304B, 304D, and 304E may include a graphical icon and/or a number as shown. Burst indications 304B, 304D, and 304E may be displayed overlaid the corresponding representative image file 302B, 302D, and 302E, respectively. Burst indications 304B, 304D, and 304E may indicate a number of images captured during the burst, which may vary with the shutter speed and amount of available storage space on mobile computing device 102M, server computing device 102S, or user account 162. For example, representative image file 302B includes burst indication 304B that indicates a total of 10 burst image files. Selecting representative image file 302B using any means known to a person of ordinary skill in the art may change the display from displaying all image files currently stored in the user account 162A to only displaying a larger version of representative image file 302B as shown in FIG. 3B. Further selection of representative image file 302B may again change the display from displaying only a larger version of representative image file 302B to displaying representative image file 302B along with a perhaps smaller display of thumbnails 306 of all the other image files in the burst shown under representative file 302B as shown in FIG. 3C. In an embodiment shown in FIG. 3C, thumbnails 306 are shown displayed under and smaller than representative image file 302B but a person of ordinary skill in the art should recognize that other graphical arrangements are possible, including graphical arrangements in which relative size and placement vary. In an embodiment, GUI 300 may overlay or otherwise display metadata or other information corresponding to the image files 153 on representative image file 302 or thumbnails 306. For example, GUI 300 may display metadata when detecting a mouse or other interface device hovering over the image for a predetermined amount of time.

Figure 3E:
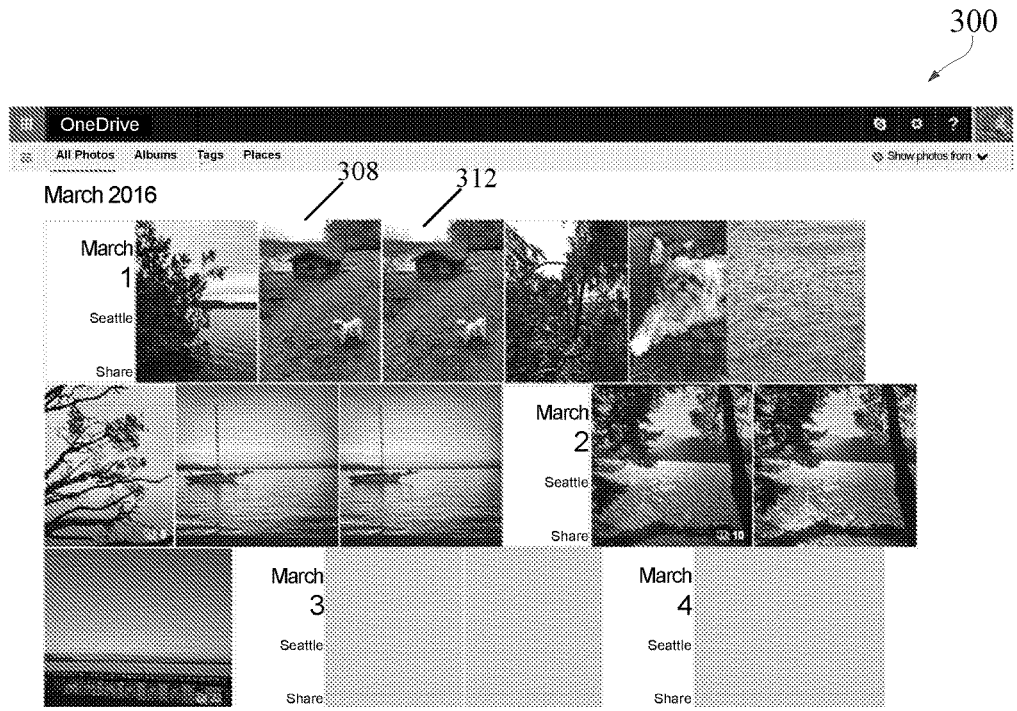

In an embodiment, image file manager 160 may automatically identify image file 308 as the best or highest quality image file of the burst based on determining image file parameters, e.g., blurriness, contrast, exposure, and the like. GUI 300, in turn, may identify image file 308 with an icon or other graphical indication 310 when it displays the currently-stored image files in user account 162A. A user may retain image file 308 identified as the best or highest quality image file of the burst, or it may change selections manually including adding alternative image files from the burst, e.g., file 312. GUI 300 may graphically indicate the selection with appropriate check marks or other graphical indications 314. GUI 300 may display a command 316 on command bar 318 that allows the user to indicate his desire to keep only the selected image files 312 and 314 and delete all other image files 306 from the burst. In response to actuation of command 316, image file manager 160 may delete unselected images 306 from the burst and GUI 300 may show both image files 312 and 314 together with all the rest of the image files currently stored in user account 162A as shown in FIG. 3E.

Figure 4:
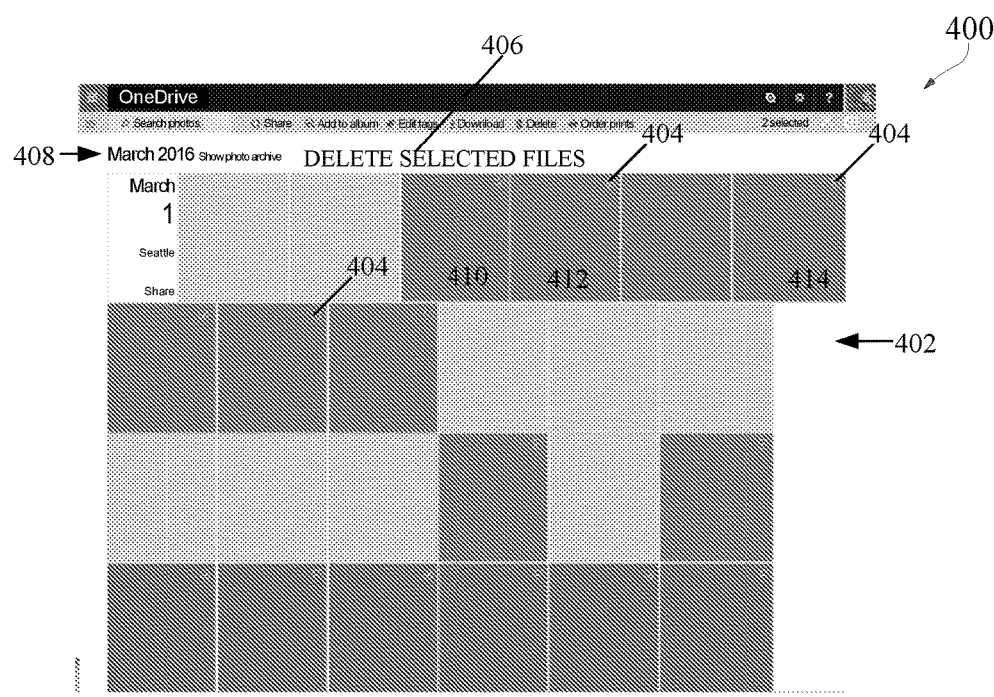
FIG. 4 illustrates an exemplary graphical user interface (GUI) for managing deletion of image files as implemented in a computer system.
Figure 5A:
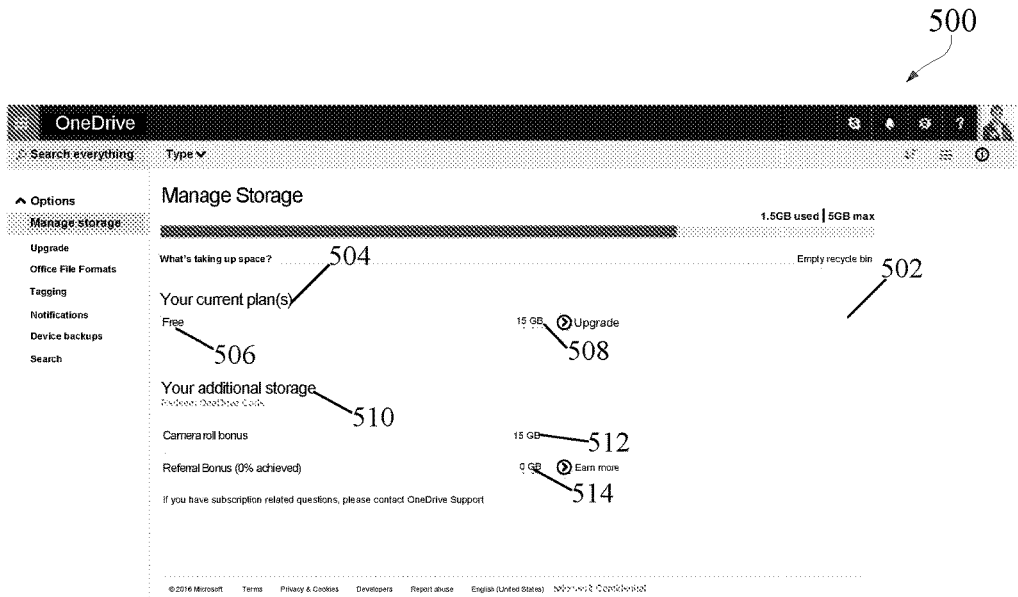
FIGS. 5A-5D illustrate an exemplary graphical user interface (GUI) for managing deletion of image files as implemented in a computer system.
Figure 5B:
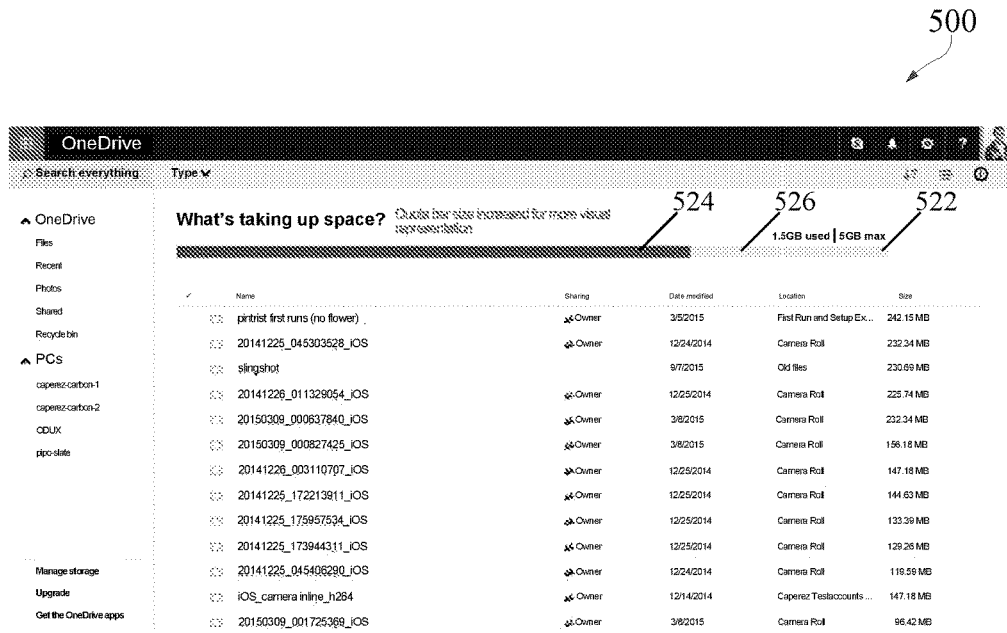
Figure 5C:
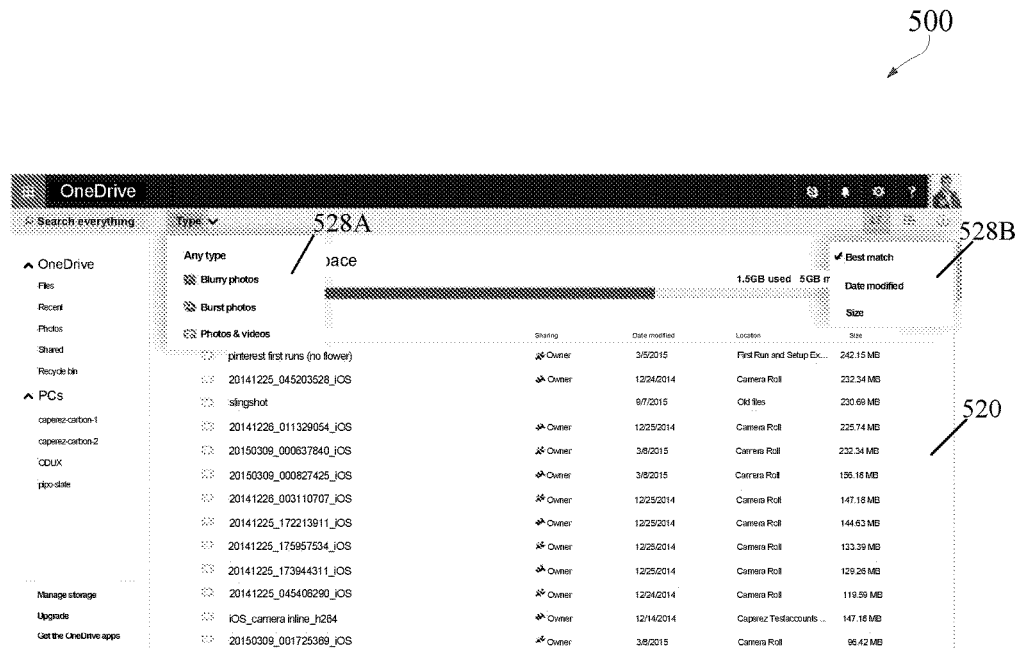
Figure 5D:
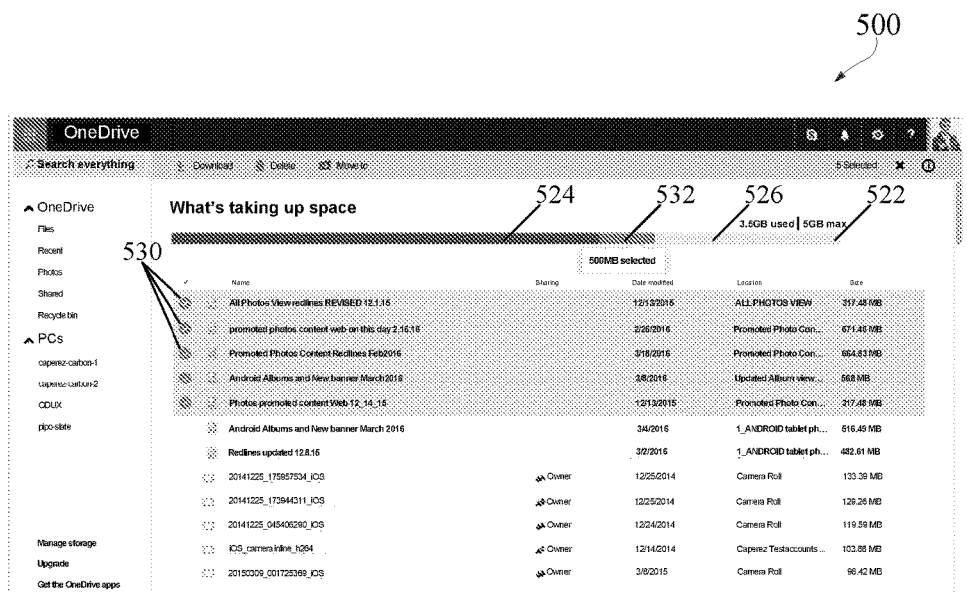

FIG. 4 illustrates an exemplary graphical user interface (GUI) 400 for managing deletion of image files as implemented in computer system 100. Referring to FIGS. 1A-1D and 4, GUI 400 may display image files 402 currently stored in user account 162A. In an embodiment, GUI 400 may display image files 402 sorted by image date but other image features, criteria, or parameters may be used to sort images as is well-known to a person of ordinary skill in the art. Image file manager 160 may automatically identify a subset of image files 302 as candidate files 152 for deletion as is explained in more detail above. GUI 400 may display, present, or otherwise distinguish candidate list 152 to a user by adding a selection icon, background color, or other graphical indication 404. GUI 400 may display a command 406 on command bar 408 that allows the user to indicate his desire to delete the selected image files, e.g., image files 410, 412, and 414.

FIGS. 5A-5D illustrate an exemplary graphical user interface (GUI) 500 for managing deletion of image files as implemented in computer system 100. Referring to FIGS. 1A-1D and 5A-5D, GUI 500 may include a display 502 to manage storage in user account 162A. Display 502 may include an indication 504 of the type of user account 506, e.g., free, and the allocated amount of storage 508, e.g., 15 Gb. Display 502 may further include available additional storage 510, camera roll bonus 512, and referral bonus 514, which may optionally increase allocated storage in exchange for a particular action, e.g., having the user recommend or refer the file manager 160 to others, e.g., friends and family.

GUI 500 may further include a display 502 that includes a storage bar 522 which displays used storage in a first portion 524 and available storage in a second portion 526. GUI 500 may include a display 520 of image files 153 stored in user account 162A. Display 520 may include sorting commands, e.g., pull down menus 528A and 528B, to sort image files 153 using a variety of criteria. In an embodiment, pull down menu 528A may allow for sorting of image files 153 by identifying blurry, burst, videos, or other image files for consideration to candidate list of image files 152 for deletion. Sorting menu 528B may include sorting criteria by best match, date modified, or size.

File manager 160 may automatically identify candidate list of image files 152 for deletion. GUI 500 may display those image files 152 with an icon or other graphical indication 530. Storage bar 522 may graphically indicate the amount of storage that would be freed up upon deletion of candidate image files 152 at shown at 532.

It will also be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. A system, comprising:
a memory device to store instructions; and
at least one processing device to execute the instructions stored in the memory device to:
determine an image file parameter for each of a plurality of files stored on a storage medium;
automatically identify candidate image files to delete based at least in part on the image file parameter representing that the candidate image files are duplicate image files or have a low quality, wherein the image file parameter includes at least one selected from a group consisting of a contrast, an image histogram, a last time accessed, a size, a time of image capture, a type of image, a blur indication, a burst characteristic, an image tonal range, and an image exposure metric;
graphically display a storage indicator indicating a total storage capacity;
provide a candidate available storage capacity on the storage medium corresponding to deleting selected ones of the candidate image files; and
delete at least some of the candidate image files based on receiving a delete indication;
wherein a first portion of the storage indicator graphically indicates available storage capacity, and wherein a second portion of the storage indicator graphically indicates the candidate storage capacity of the candidate image files to delete.

2. The system of claim 1, wherein the at least one processing device executes the instructions stored in the memory device further to:
store the at least one file after deleting the at least some of the candidate image files.

3. The system of claim 2, wherein the at least one processing device executes the instructions stored in the memory device further to:
graphically identify the candidate image files to delete using a selection icon on each candidate image file.

4. The system of claim 1, wherein the at least one processing device executes the instructions stored in the memory device further to graphically display:
a list of the plurality of files;
a resettable selection icon corresponding to each candidate image file to delete; and
a delete icon to enable the delete indication.

5. The system of claim 1, wherein the at least one processing device executes the instructions stored in the memory device further to:

sort the plurality of files based at least in part on the image file parameter.

6. The system of claim 1, wherein the at least one processing device executes the instructions stored in the memory device to delete the at least some of the candidate image files based on receiving the delete indication until the candidate available storage capacity is sufficient to store at least one file.

7. The system of claim 1, wherein the at least one processing device executes the instructions stored in the memory device further to:
graphically display a command confirming deletion of the candidate image files.

8. A method comprising:
determining, using a computing device, available storage capacity on a storage medium to store at least one file;
determining, using the computing device, an image file parameter for each of a plurality of files stored on the storage medium;
identifying, using the computing device, a subset of the plurality of files to delete based on the image file parameter representing that each file included in the subset is a duplicative file or has a low quality;
graphically displaying, using the computing device, the subset of the plurality of files to delete using a selection icon corresponding to each of the subset of the plurality of files to delete;
providing, using the computing device, a storage indicator graphically displaying a first portion corresponding to the available storage capacity and a second portion corresponding to a storage capacity of the subset of the plurality of files to delete;
causing, using the computing device, at least partial deletion of at least one of the subset of the plurality of files; and
storing, using the computing device, the at least one file after the at least partial deletion.

9. The method of claim 8, wherein identifying the subset of the plurality of files to delete includes automatically identifying the subset of the plurality of files to delete based on a predetermined threshold for the available storage capacity on the storage medium.

10. The method of claim 8, further comprising:
receiving, at the computing device, a selection of at least some of the subset of the plurality of files; and
causing, using the computing device, at least partial deletion of the selected some of the subset of the plurality of files.

11. The method of claim 8, further comprising:
using the computing device to graphically display:
the plurality of files;
the selection icon on each of the subset of the plurality of files to delete; and
a command icon to enable at least partial deletion of the subset of the plurality of files based at least in part on the selection icon.

12. The method of claim 8, wherein using the computing device to identify the subset of the plurality of files to delete based on the image file parameter further comprises:
sorting the plurality of files based on the image file parameter of a corresponding file.

13. The method of claim 8, further comprising using the computing device to graphically display:
thumbnails of each of the plurality of files; and
metadata corresponding each file of the plurality of files overlaid each of the thumbnails.

14. The method of claim 8, further comprising:
using the computing device to graphically display a dialog box confirmation the at least partial deletion of the at least a portion of the subset of the plurality of files.

15. The method of claim 8, wherein determining, using the computing device, the image file parameter for each of the plurality of files stored on the storage medium includes determining, for each of the plurality of files stored on the storage medium, at least one selected from a group consisting of a contrast, an image histogram, a last time accessed, a size, a time of image capture, a type of image, a blur indication, an image tonal range, an image exposure metric, and a burst characteristic.

16. A non-transitory computer-readable storage medium comprising instructions that, when executed by one or more processing devices, cause the one or more processing devices to:
measure available storage capacity on a storage medium to store at least one file;
determine an image file parameter for each of a plurality of files stored on a storage medium;
identify a burst image included in the plurality of files as a highest quality image within a burst of images;
graphically display burst image included in the plurality of files as the highest quality image within the burst of images using an icon corresponding to the burst image identified as the highest quality image within the burst of images;
automatically identify a subset of the plurality of files to delete based on the image file parameter representing that each file included in the subset is a duplicative file or has a low quality, wherein the subset of the plurality of files to delete excludes the burst image identified as the highest quality image within the burst of images;
graphically display a storage indicator having a first portion corresponding to the available storage capacity and a second portion corresponding to a storage capacity of the subset of the plurality of files to delete;
delete at least a portion of the subset of the plurality of files; and
store the at least one file after deleting the at least the portion of the subset of the plurality of files.

17. The non-transitory computer-readable storage medium of claim 16, wherein execution of the instructions by the one or more processing devices, cause the one or more processing devices further to graphically display:
a list of the plurality of files;
a selection icon corresponding to each file of the subset of the plurality of files to delete; and
a command icon to enable at least partial deletion of the subset of the plurality of files based at least in part on the selection icon.

18. The non-transitory computer-readable storage medium of claim 16, wherein determining the image file parameter for each of the plurality of files stored on the storage medium includes determining, for each of the plurality of files stored on the storage medium, at least one selected from a group consisting of a contrast, an image histogram, a last time accessed, a size, a time of image capture, a type of image, a blur indication, an image tonal range, an image exposure metric, and a burst characteristic.

19. The non-transitory computer-readable storage medium of claim 16, wherein execution of the instructions by the one or more processing devices, cause the one or more processing devices to automatically identify the subset of the plurality of files to delete by automatically identifying the subset of the plurality of files to delete in response to determining that the storage medium has insufficient storage capacity to store the at least one file.

20. The non-transitory computer-readable storage medium of claim 16, wherein execution of the instructions by the one or more processing devices, cause the one or more processing devices to automatically identify the subset of the plurality of files to delete by automatically identifying the subset of the plurality of files to delete based on a predetermined schedule.

* * * * *